United States Patent Office 3,357,829
Patented Dec. 12, 1967

3,357,829
RINSE COMPOSITION FOR AND METHOD OF
ELECTROPHOTOGRAPHIC PRINTING
Clyde A. Moe, Sanford, and John A. Easley, Midland, Mich., assignors to The Dow Chemical Company, Midland, Mich., a corporation of Delaware
No Drawing. Filed Nov. 9, 1964, Ser. No. 409,990
8 Claims. (Cl. 96—1)

This invention relates to electrophotographic printing processes and more particularly is concerned with a new and novel rinsing liquid having a high flash point, a high electrical resistivity, and a low toxicity, which is economical and safe, thus highly useful for rinsing imaged electrophotographic plates.

Exemplary of an electrophotographic printing process for preparing photoengraving plates is one wherein a photoconductive composition comprising, for example, a photoconductive zinc oxide suspended as a fine dispersion of micron sized particles in a cross-linkable, film forming, insulating silicone resin as a binder, is coated on, for instance, a thin magnesium plate. The plate so-coated, commonly referred to as a recording element, is then negatively electrostatically charged and exposed to an illuminated image desired to be reproduced, thereby to form a latent electrostatic image. This latent image is then developed, for example, by first contacting said latent image with triboelectric catalyst particles of, for example, aluminum octanoate, suspended, for instance, in a carrier liquid of n-heptane. Following said contact, the coating, now catalyzed with said triboelectric catalyst in a pattern conforming to the electrostatic image, is conventionally rinsed in, for example, a liquid comprising primarily isooctane containing various resinous additives in order to wash off the developing solution and the excess deposition of catalyst. Thereafter, the rinsed plate is cured (cross-linked) by heating to convert the resin binder in the composition to an acid etchant resist, followed by removal of the composition from the non-image areas of the coating, whereupon, the plate may be etched, for example, by means of the recently developed powderless etching process.

The rinses heretofore used as hereinbefore described are substantially unacceptable in that several serious disadvantages attend their use. For example, these rinses are uneconomical requiring in some cases expensive resinous additives. Moreover, they are highly flammable, thus represent a significant safety hazard. For example, isooctane has a flash point of about 12° F. In addition, some of the rinse ingredients are quite toxic to handle and inhale, thus, in addition to being flammable, are deleterious to health as well. Also said rinses, in addition to providing only a nominally acceptable rinsing action in general, do not provide clean non-image areas and sharp images as are desired.

The term "rinsing action" as used herein refers to the overall rinsing effectiveness of a given rinse with respect to (1) removing catalyst from the non-image areas so that the resin in said areas does not cross-link during curing, and (2) removing only the catalyst material in the image areas not electrically and/or poorly adhering thereto.

Ideally then, a rinsing liquid for the purpose heretofore set forth should have a high flash point above, for example, about 100° F. It should thoroughly remove all (but only) excess catalyst, foreign matter, and the like from both the image and non-image areas and have an evaporation rate such as to be capable of being air dried off the plate within, for example, about 5–6 minutes or less after rinsing. Though such a rines should have a high evaporation rate for fast drying, it should not have an objectionable and irritating odor nor be toxic and irritating to the skin. Also, and very important, such a rinse should leach out of the coating as little of the resinous binder as possible having a high electrical resistivity such that a sufficient rinse capacity of, for instance, 30 to 40 plates or more can be obtained from one rinse charge.

A principal object of the present invention, therefore, in the process for preparing photoengraving plates is to provide a novel and improved, high resistivity, high flash, and non-toxic rinse composition which in general provides good rinsing action, and which in addition is also economical, efficient, and safe.

This and other objects and advantages have been found obtainable by means of the novel rinse composition of the present invention which comprises: (a) from about 30 to about 50 parts by volume of a fluorinated hydrocarbon liquid, (b) from about 40 to about 60 parts by volume of a particular isoparaffinic liquid, and from about 10 to about 30 parts by volume of a second particular isoparaffinic hydrocarbon.

Preferably, about 30 parts by volume of the fluorinated hydrocarbon liquid, about 40 parts by volume of the first isoparaffinic liquid and about 30 parts by volume of the second isoparaffinic hydrocarbon will be employed in formulating the present rinse composition.

The fluorinated hydrocarbon liquid which is preferred for use in the present rinse is a stable fluorinated hydrocarbon corresponding to the formula $CCl_2F$—$CClF_2$ called Freon TF (trademark) which is a non-flammable liquid having a molecular weight of 187.39, a boiling point of 117.63° F., an evaporation rate of 170 seconds (based on $CCl_4$ being 100), a Kauri-Butanol value of 31, and which has a very low toxicity level.

The first isoparaffinic hydrocarbon, which is preferred for use in the invention, is called Isopar E (trademark). This is a synthetic hydrocarbon liquid of very high purity, having an extremely low odor level manufactured by the Humble Oil and Refining Company. The liquid has a boiling range of 240°–290° F., a flash point (Tag Closed Cup) of about 50° F., a Kauri-Butanol value of about 29, and an evaporation rate of about 353 seconds. In addition, it has a very low toxicity level.

The second isoparaffinic liquid which is preferred for use in the present invention is called Isopar G (trademark) and is distributed by the Humble Oil and Refining Company. This is a synthetic hydrocarbon liquid of very high purity characterized by a Kauri-Butanol value of about 27, a flash point of about 104° F., an evaporation rate at 100 percent concentration of about 3180 seconds, a boiling range of from 318° to 350° F., and a low toxicity.

When employing the present rinse composition after being formulated, it is thoroughly mixed, whereupon, it can be used immediately or be stored indefinitely before use. When used it is charged into a suitable rinse tank, such as, for example, the type manufactured by the Master Etching Machine Co. adapted to provide a uniform liquid curtain of the rinse composition through which the plate must pass upon being immersed in the tank so-charged and withdrawn. A plate to be rinsed, after having been contacted with the aforesaid catalyst material, is then immersed in and withdrawn from said tank, for example, from about 2 to about 10 times, and preferably 3 to 4 times, to provide inversely a suitable contact time of, for example, from about 3 to about 8 seconds per immersion-withdrawal. Upon the last withdrawal the plate is allowed to drain and then dried either in air or by forced air, preferably the latter. The plate so-rinsed is then subjected to the remaining steps of preparing a photoengraving plate as described above. The present novel rinse composition is good, for example, for rinsing a maximum of about 30–40 full size (18″ x 24″) plates, or "flats" as they are called and is safe for use since it has a flash point of about 104° F.

The present invention, therefore, provides a high flash, high resistivity, non-toxic rinsing liquid highly useful in rinsing imaged and developed photoconductive-coated electrophotographic printing plates, containing in said coating a cross-linking binder and a photoconductive zinc oxide. It provides, moreover, a novel and improved rinsing liquid having good rinsing action, which is economical, efficient, and safe such that when used in the electrophotographic preparation of, for example, photoengraving plates, a significant improvement is obtained.

The following examples further illustrate the present invention but are not to be construed as limiting the invention thereto.

*Example I*

A number of photoengraving grade magnesium plates each 18" x 24" in size and 0.064" in thickness were spray coated with a zinc oxide-silicone binder photoconductive composition. These plates were then further electrophotographically processed to the point of rinsing by electrostatically negatively charging, followed by exposing them to a light image and contacting the plates so-exposed with an aluminum octanoate cross-linking promoting catalyst suspended in a carrier liquid.

A 10-liter capacity rinse tank of the type hereinbefore described was then readied by charging it to capacity with the present novel rinse composition comprising about 30 parts by volume of the Freon TF, fluorinated hydrocarbon, 40 parts by volume of the Isopar E, isoparaffinic hydrocarbon, and 30 parts by volume of the Isopar G, isoparaffinic hydrocarbon. The above prepared plates were then rinsed therein by immersing and withdrawing them out through the spray curtain provided in the machine about 4 times, with each immersion and withdrawal sequence being about 3 seconds in duration. After rinsing, each plate was allowed to completely dry in air for about 5 minutes. Subsequent processing of the plates, including powderless etching, produced excellent quality image areas, that is, the areas covered by a photoresist and also, clear, substantially resist-free, non-image areas.

This example shows that a good rinsing action was obtained in the non-image areas while yet not washing off detrimental quantities of the catalyst deposition in the image areas. This together with its safety features, that is, high flash point and relatively low toxicity, provides a new and novel rinse composition highly suitable for use in making high quality photoengraving plates.

*Example II*

The procedure and activity of Example I was repeated except that the plates were immersed and withdrawn in and out of the rinse about 10 times. In this case the rinsing action was good in the non-image areas but the images produced were of a slightly lesser quality than previously obtained, but still very usable, showing that more catalyst was removed from the coating in the image areas than in Example I.

*Example III*

Example I was again repeated except that the plates were immersed and withdrawn twice. In this case, the images produced subsequently were usable and of acceptable quality but were not quite as sharply defined since a less than desirable amount of catalyst was removed from the non-image areas. Accordingly, the non-image areas after etching exhibited more pimple-like projection than when like plates were rinsed 4 times as in Example I.

The immersion times may vary from those used in the examples depending on the number of rinses (immersion-withdrawals) employed, strength of the rinse, and the like.

*Example IV*

The procedure and activity of Example I was repeated except that the rinse composition used comprised 30 parts by volume of the Freon TF, fluorinated hydrocarbon, 60 parts by volume of the Isopar E, isoparaffinic hydrocarbon, and 10 parts by volume of the Isopar G, isoparaffinic hydrocarbon liquid. When used as a rinse as described acceptable photoengraving plates were produced having images and non-image areas of a slightly lesser quality than obtained in Example I.

*Example V*

Similarly as in Example IV a number of recording elements were rinsed in the present rinse composition but comprising 50 parts by volume of the Freon TF, 40 parts by volume of the Isopar E, and 10 parts by volume of Isopar G. Acceptable resultant photoengraving plates were again claimed.

It is manifest that various modifications can be made in the process of the present invention without departing from the spirit or scope thereof and it is understood that we limit ourselves only as defined in the appended claims.

We claim:

1. In the electrophotographic preparation of etchable photoengraving plates including: (a) providing a photoconductive composition comprising, a photoconductive zinc oxide suspended in a cross-linking resinous insulating binder coated on a metal plate, (b) electrostatically charging said coated plate, (c) exposing the charged plate to an illuminated image to form a latent electrostatic image, (d) contacting said latent image with a cross-linking promoting catalyst material, (e) rinsing the plate so-contacted in a rinsing liquid, (f) curing the plate at an elevated temperature, (g) removing the non-image areas, and (h) contacting the so-treated plate with a powderless etching bath; the improvement comprising, rinsing the catalyst-contacted plate with a rinse composition comprising: (1) from about 30 to about 50 parts by volume of a stable, low toxicity, non-flammable fluorinated hydrocarbon liquid characterized by a Kauri-Butanol value of about 31, an evaporation rate of 170 seconds (based on $CCl_4$ being 100), a boiling point of about 117.63° F. and a molecular weight of about 187.39; (2) from about 40 to about 60 parts by volume of a high purity, low toxicity, isoparaffinic solvent, having a Kauri-Butanol value of about 29, an evaporation rate of about 353 seconds, and a flash point (TCC) of about 50° F.; and (3) from about 10 to about 30 parts by volume of an isoparaffinic hydrocarbon characterized by a Kauri-Butanol value of about 27, an evaporation rate of about 3180 seconds, a flash point of about 104° F. (TCC), and a boiling range of from 318° F. to 350° F.

2. The improvement of claim 1 wherein the rinsing step comprises contacting said element with the rinsing composition by immersing and withdrawing said plate into and out of said composition from about 2 to about 10 times.

3. The improvement of claim 2 wherein the element is immersed and withdrawn from about 3 to about 4 times.

4. The improvement of claim 2 wherein the period for each immersion and withdrawal of the element for the rinse is from about 3 to about 8 seconds.

5. A method of rinsing an electrostatically charged electrophotographic recording element comprising a photoconductive zinc oxide dispersed in a cross-linking insulating resin as a photoconductive mixture coated on a metal plate, which element has first been exposed to an illuminated image followed by contact with a cross-linking promoting catalyst comprising; immersing and withdrawing said element through a liquid curtain of a rinsing composition from about 2 to about 10 times, said rinsing composition comprising: (1) from about 30 to about 50 parts by volume of a stable, low toxicity, non-flammable fluorinated hydrocarbon liquid characterized by a Kauri-Butanol value of about 31, an evaporation rate of 170 (based on $CCl_4$ being 100), a boiling point of about 117.63° F. and a molecular weight of about 187.39;

(2) from about 40 to about 60 parts by volume of a high purity, low toxicity, isoparaffinic solvent, having a Kauri-Butanol value of about 29, an evaporation rate of about 353, and a flash point (TCC) of about 50° F.; and (3) from about 10 to about 30 parts by volume of an isoparaffinic hydrocarbon liquid characterized by a Kauri-Butanol value of about 27, an evaporation rate of about 3180, a flash point of about 104° F. (TCC), and a boiling range of from about 318° to about 350° F.

6. The method of claim 5 wherein the period for each immersion and withdrawal of the element is from about 3 to about 8 seconds.

7. The method of claim 5 wherein the rinsing composition comprises about 30 parts by volume of the fluorinated hydrocarbon, 40 parts by volume of the isoparaffinic liquid charactertized by a Kauri-Butanol value of about 29, an evaporation rate of about 353 seconds, and a flash point (TCC) of about 50° F. and about 30 parts by volume of an isoparaffinic hydrocarbon characterized by a Kauri-Butanol value of about 27, an evaporation rate of about 3180 seconds, a flash point of about 104° F. (TCC), and a boiling range of from 318° to 350° F.

8. A rinse composition for use in the electrophotographic preparation of photoengraving plates comprising: (1) from about 30 to about 50 parts by volume of a stable, low toxicity, non-flammable fluorinated hydrocarbon liquid characterized by a Kauri-Butanol value of about 31, an evaporation rate of 170 (based on $CCl_4$ being 100), a boiling point of about 117.63° F. and a molecular weight of about 187.39; (2) from about 40 to about 60 parts by volume of a high purity, low toxicity, isoparaffinic solvent, having a Kauri-Butanol value of about 30, an evaporation rate of about 353, and a flash point (TCC) of about 50° F.; and (3) from about 10 to about 30 parts by volume of an isoparaffinic hydrocarbon liquid characterized by a Kauri-Butanol value of about 27, an evaporation rate of about 3180, a flash point of about 104° F. (TCC), and a boiling range of from about 318° to about 350° F.

References Cited
UNITED STATES PATENTS

| | | | |
|---|---|---|---|
| 3,062,684 | 11/1962 | Nakamura | 134—40 X |
| 3,215,527 | 11/1965 | Johnson | 96—1 |
| 3,276,896 | 10/1966 | Fisher | 117—37 |

NORMAN G. TORCHIN, *Primary Examiner.*

C. E. VAN HORN, *Assistant Examiner.*